J. G. ELLIS.
FILTER.
APPLICATION FILED DEC. 17, 1920.

1,433,357.

Patented Oct. 24, 1922.

Inventor
J. G. Ellis,
By [signature]
Attorney

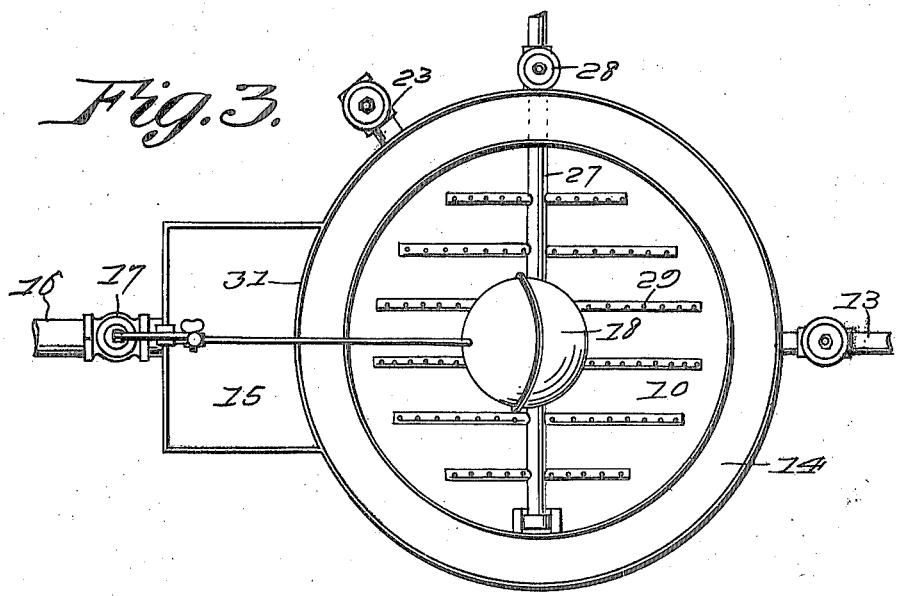
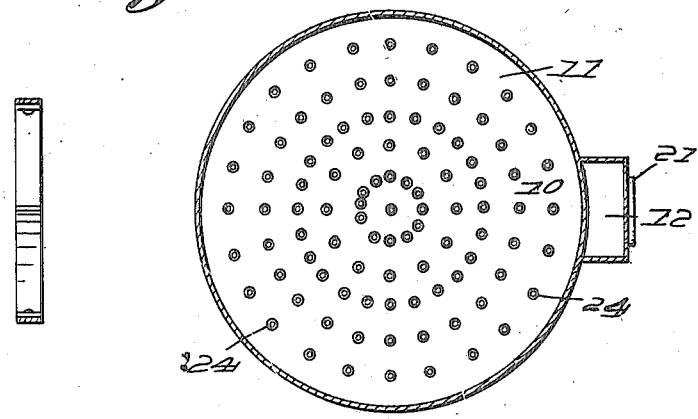

Patented Oct. 24, 1922.

1,433,357

UNITED STATES PATENT OFFICE.

JAMES G. ELLIS, OF COLUMBUS, MISSISSIPPI.

FILTER.

Application filed December 17, 1920. Serial No. 431,390.

*To all whom it may concern:*

Be it known that JAMES G. ELLIS, a citizen of the United States of America, residing at Columbus, in the county of Lowndes and State of Mississippi, has invented new and useful Improvements in Filters, of which the following is a specification.

The object of the invention is to provide an efficient construction of filter especially designed for water for domestic and like purposes and having means whereby the flow of the liquid therethrough may be automatically regulated to correspond with the rapidity of consumption and also whereby the cleansing of the filtering agencies to remove accumulations of sediment or impurities thereon may be effected without dismounting or disassembling the parts; and with these objects in view the invention consists in a construction, combination and relation of parts of which a preferred embodiment is shown in the drawing, wherein:—

Figure 3 is a plan view.

Figure 4 is a horizontal section on the plane indicated by the line 4—4 of Figure 1.

Figure 1:
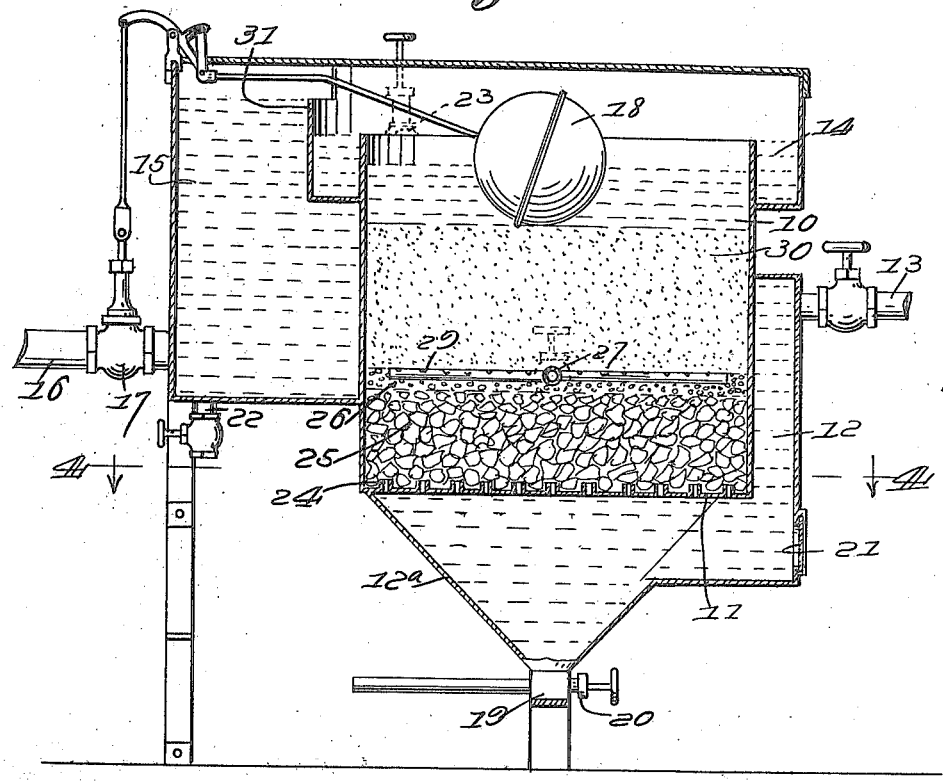
Figure 1 is a sectional view of the apparatus.
Figure 5:
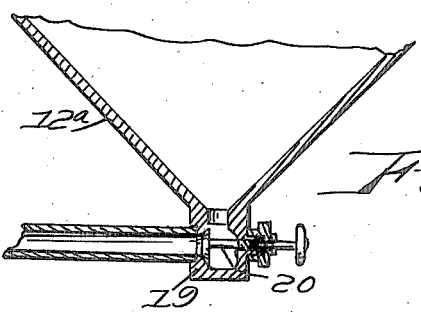
Figure 5 is a detail vertical section on the plane indicated by the line 5—5 of Figure 2.
Figure 2:
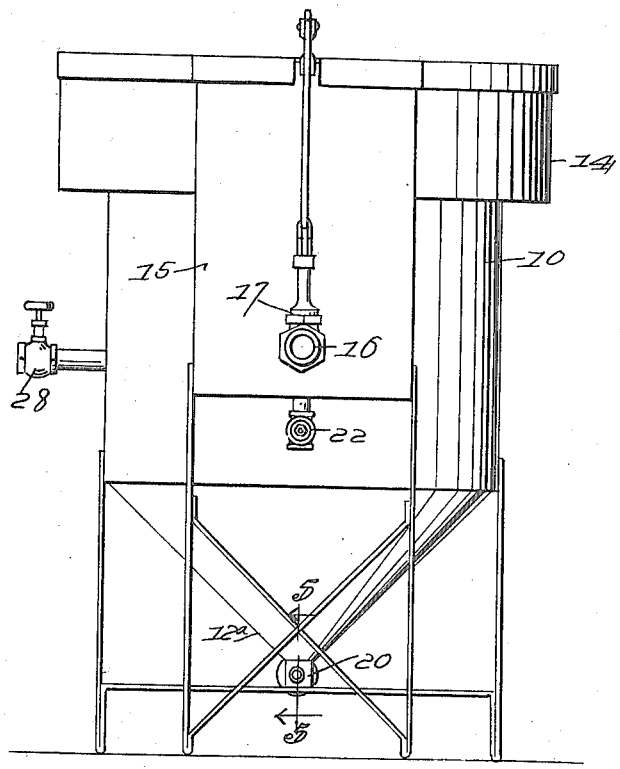
Figure 2 is a front elevation of the same.
Figure 6:
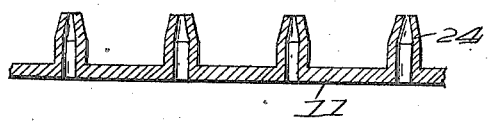
Figure 6 is a detail enlarged sectional view of a portion of the floor of the filter chamber.

The casing of the filter which may be constructed of any preferred or approved material and may be of any suitable dimensions to be determined by the purpose for which the apparatus is designed is divided interiorly to form a filter chamber 10 adapted to contain a filtering agent of a granular form such as gravel, sand and the like, preferably associated and arranged as hereinafter particularly indicated and having a bottom 11 which is perforated for communication with the clear water chamber 12 from which extends the valved outlet pipe or conductor 13. Said casing also encloses a settling trough 14 which surrounds the upper edge of the filter chamber and is in communication with the inlet or primary settling chamber 15 with which communicates the supply pipe 16 having a supply valve 17 preferably controlled by a float 18 arranged in the filter chamber to the end that the rapidity of supply may be regulated by the contents of the filter chamber and reduced or cut off as the water accumulates in said filter chamber from which the water passes as it is filtered to the clear water or discharge chamber 12.

The discharge chamber is preferably provided with a conical or hopper bottom 12$^a$ having an outlet or vent 19 at its apex or lowermost point fitted with a blow-off or clean-out valve 20 so that accumulations of sand or like fine filtering material which may pass downward through the perforated bottom of the filter chamber may be washed or blown out through the vent, the fact of the accumulations being apparent by reason of a gauge or inspection glass disposed in the cover of the clean-out manhole 21 which is arranged in the side wall of the clear water or discharge chamber 12.

In communication with the primary settling or inlet chamber 15 at the bottom thereof there is located a valved clean out vent 22 and in communication with the secondary settling trough 14 adjacent to the plane of the upper edge of the filter chamber there is located a valved overflow vent 23 so that when the flow of water is being reversed through the filtering material as hereinafter explained, the water passing from the filter chamber into the trough 14 may be permitted to escape and carry with it any accumulations removed from the surfaces of the particles of granular material in the filter chamber.

The perforations in the bottom of the filter chamber are preferably provided with upwardly extending nipples 24 which as illustrated may be flattened or transversely contracted or reduced to minimize the passage of filter sand or granular material therethrough while permitting a relatively free flow of water from the filter chamber to the clear water or discharge chamber, and the preferred arrangement of the filtering material contemplates the use of a coarse gravel as indicated at 25 arranged upon the bottom of the filter chamber in a layer of adequate thickness surmounted by a layer of relatively fine gravel as shown at 26, at the upper surface of which is arranged a water distributing clean-out nozzle 27 provided with a controlling valve 28 and provided with a series of parallel perforated distributing tubes 29 through which water may be distributed forcibly in an upward direction to pass through a body of sand 30 which is arranged in the filter chamber upon the layer of fine gravel and above the plane of said clean-out nozzle.

In operation the water admitted through the supply pipe is first subjected to a settling operation and for efficiency in removing impurities from the water it is preferable to treat the same either in this settling chamber or prior to its admission thereto with a coagulating reagent such as alum, the water then passes over the outer wall or barrier 31 of the secondary settling member or trough 14 from which in turn it passes over the upper edge of the wall of the filter chamber and passes downward through the filter or granular filtering material to the outlet or discharge chamber 12 from which it may be drawn as required through the outlet pipe or conductor 13.

Having described the invention, what is claimed as new and useful is:—

1. A filter having a filter chamber provided at its bottom with upstanding nipples and adapted to contain granular filtering material, a clear water or discharge chamber for receiving water passing through said nipples and having an outlet or discharge conductor, an inlet or primary settling chamber in communication with a source of supply, and a secondary settling trough interposed between the primary settling chamber and the filtering chamber and accessible to both of said chambers over intervening barriers or walls, the discharge chamber having beneath the bottom of the filter chamber a downwardly contracted or funnel shaped portion fitted at its lowermost point with a valved vent.

2. A filter having a filter chamber provided at its bottom with upstanding nipples and adapted to contain granular filtering material, a clear water or discharge chamber for receiving water passing through said nipples and having an outlet or discharge conductor, an inlet or primary settling chamber in communication with a source of supply, and a secondary settling trough interposed between the primary settling chamber and the filtering chamber and accessible to both of said chambers over intervening barriers or walls, said primary settling chamber being provided in communication with its bottom with a valved discharge opening.

3. A filter having a filter chamber provided at its bottom with upstanding nipples and adapted to contain granular filtering material, a clear water or discharge chamber for receiving water passing through said nipples and having an outlet or discharge conductor, an inlet or primary settling chamber in communication with a source of supply, and a secondary settling trough interposed between the primary settling chamber and the filtering chamber and accessible to both of said chambers over intervening barriers or walls, a valved overflow outlet being arranged in communication with said interposed secondary settling trough.

4. A filter having a filter chamber provided with a perforated bottom, inlet and discharge chambers in communication with the filter chamber respectively at its upper edge and at its bottom, said filter chamber being adapted to contain granular filtering material, and a valved clean out nozzle arranged in the filtering chamber and provided with horizontally disposed perforated distributing tubes.

5. A filter having a filter chamber provided with a perforated bottom, inlet and discharge chambers in communication with the filter chamber respectively at its upper edge and at its bottom, said filter chamber being adapted to contain granular filtering material, and a valved cleanout nozzle arranged in the filtering chamber and provided with horizontally disposed perforated distributing tubes with their perforations directed upwardly, said nozzle being disposed in a plane below the upper surface of the contained filtering material.

6. A filter having a filter chamber provided with a perforated bottom wall, a clear water or discharge chamber for receiving water from the filter chamber and provided with an outlet conductor, an inlet or primary settling chamber, a secondary settling trough interposed between the primary settling chamber, and the filter chamber, a valve controlled supply pipe communicating with the primary settling chamber, and a float controlling said valve and actuatable by the fluid contents of the filter chamber.

In testimony whereof he affixes his signature.

JAMES G. ELLIS.